(12) United States Patent
Bahirat et al.

(10) Patent No.: US 11,544,668 B2
(45) Date of Patent: Jan. 3, 2023

(54) METHOD FOR MAINTAINING INVENTORY IN A STORE

(71) Applicant: Simbe Robotics, Inc., South San Francisco, CA (US)

(72) Inventors: Kanchan Bahirat, South San Francisco, CA (US); Shiva Reddy, South San Francisco, CA (US); Bradley Bogolea, South San Francisco, CA (US); Jariullah Safi, South San Francisco, CA (US)

(73) Assignee: Simbe Robotics, Inc., South San Francisco, CA (US)

( * ) Notice: Subject to any disclaimer, the term of this patent is extended or adjusted under 35 U.S.C. 154(b) by 0 days.

(21) Appl. No.: 17/836,778

(22) Filed: Jun. 9, 2022

(65) Prior Publication Data

US 2022/0309448 A1    Sep. 29, 2022

Related U.S. Application Data

(63) Continuation-in-part of application No. 17/727,044, filed on Apr. 22, 2022, which is a continuation of
(Continued)

(51) Int. Cl.
*G06Q 10/08* (2012.01)
*G05D 1/02* (2020.01)
(Continued)

(52) U.S. Cl.
CPC ........ *G06Q 10/087* (2013.01); *G05D 1/0274* (2013.01); *G05D 1/0282* (2013.01);
(Continued)

(58) Field of Classification Search
CPC .. G06Q 30/0248; G06Q 30/02; G06Q 10/087; G06Q 10/08; G06Q 20/201;
(Continued)

(56) References Cited

U.S. PATENT DOCUMENTS 8,577,136 B1 * 11/2013 Ascher ................. G06Q 10/087
382/165
10,438,165 B2 * 10/2019 Findlay ................ G06Q 10/087
(Continued)

*Primary Examiner* — Andrew Joseph Rudy
(74) *Attorney, Agent, or Firm* — Run8 Patent Group, LLC; Peter Miller

(57) ABSTRACT

A method for maintaining inventory within a store includes: accessing an image (e.g., a color image, depth image) depicting an inventory structure; detecting a slot region of the image depicting a slot; identifying a product type assigned to the slot; accessing a product dimension of the product type; defining a target region within the slot in the image based on the product dimension; defining a product region within the slot in the image based on the product dimension and the target region; defining a back-of-shelf plane intersecting the target region of the image; detecting a surface within the product region; and, in response to the surface intersecting the back-of-shelf plane, identifying the slot as empty and generating a prompt to restock the slot with product units of the product type.

18 Claims, 4 Drawing Sheets

Related U.S. Application Data application No. 16/578,406, filed on Sep. 23, 2019, now Pat. No. 11,341,454, which is a continuation of application No. 15/600,527, filed on May 19, 2017, now Pat. No. 10,467,587.

(60) Provisional application No. 63/209,330, filed on Jun. 10, 2021, provisional application No. 62/339,039, filed on May 19, 2016.

(51) Int. Cl.
*H04N 5/232* (2006.01)
*H04N 1/00* (2006.01)
*H04N 5/357* (2011.01)
*G06V 10/98* (2022.01)
*G06V 20/52* (2022.01)
*G06K 9/62* (2022.01)

(52) U.S. Cl.
CPC ......... *G06K 9/6201* (2013.01); *G06K 9/6217* (2013.01); *G06V 10/987* (2022.01); *G06V 20/52* (2022.01); *H04N 1/00* (2013.01); *H04N 5/23203* (2013.01); *H04N 5/23229* (2013.01); *H04N 5/23238* (2013.01); *H04N 5/35721* (2018.08); *G05D 1/0246* (2013.01); *G05D 2201/0207* (2013.01)

(58) Field of Classification Search
CPC ........ G06Q 20/20; G06V 10/22; G06V 10/40; G06V 20/41; G06V 20/10; G06V 20/52; G06V 20/00; G06V 30/2247; G06V 20/36; G06K 9/6215; G06K 9/62; G06K 9/46; G06K 9/00; G06T 7/00; G06T 7/11; G06T 7/0008
USPC ............................................ 700/259; 705/28
See application file for complete search history.

(56) References Cited

U.S. PATENT DOCUMENTS

| | | | |
|---|---|---|---|
| 10,607,182 B2* | 3/2020 | Shah | G05D 1/0274 |
| 11,126,962 B2* | 9/2021 | Bogolea | G06V 20/52 |
| 11,276,034 B2* | 3/2022 | Shah | G05D 1/0274 |
| 2021/0049542 A1* | 2/2021 | Dalal | G06Q 30/0639 |
| 2022/0026920 A1* | 1/2022 | Ebrahimi Afrouzi | G05D 1/0044 |
| 2022/0058425 A1* | 2/2022 | Savvides | G06V 10/82 |
| 2022/0083959 A1* | 3/2022 | Skaff | G09F 3/0297 |

* cited by examiner

METHOD FOR MAINTAINING INVENTORY IN A STORE

CROSS-REFERENCE TO RELATED APPLICATIONS

This Application is a continuation-in-part application of U.S. patent application Ser. No. 17/727,044, filed on 22 Apr. 2022, which is a continuation of U.S. patent application Ser. No. 16/578,406, filed on 23 Sep. 2019, which is a continuation of U.S. patent application Ser. No. 15/600,527, filed on 19 May 2017, which claims the benefit of U.S. Provisional Application 62/339,039 filed on 19 May 2016, all of which are incorporated in their entireties by this reference.

This Application claims priority to U.S. Provisional Application No. 63/209,330, filed on 10 Jun. 2021, which is incorporated in its entirety by this reference.

TECHNICAL FIELD

This invention relates generally to the field of stock keeping and more specifically to a new and useful method for maintaining inventory within a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
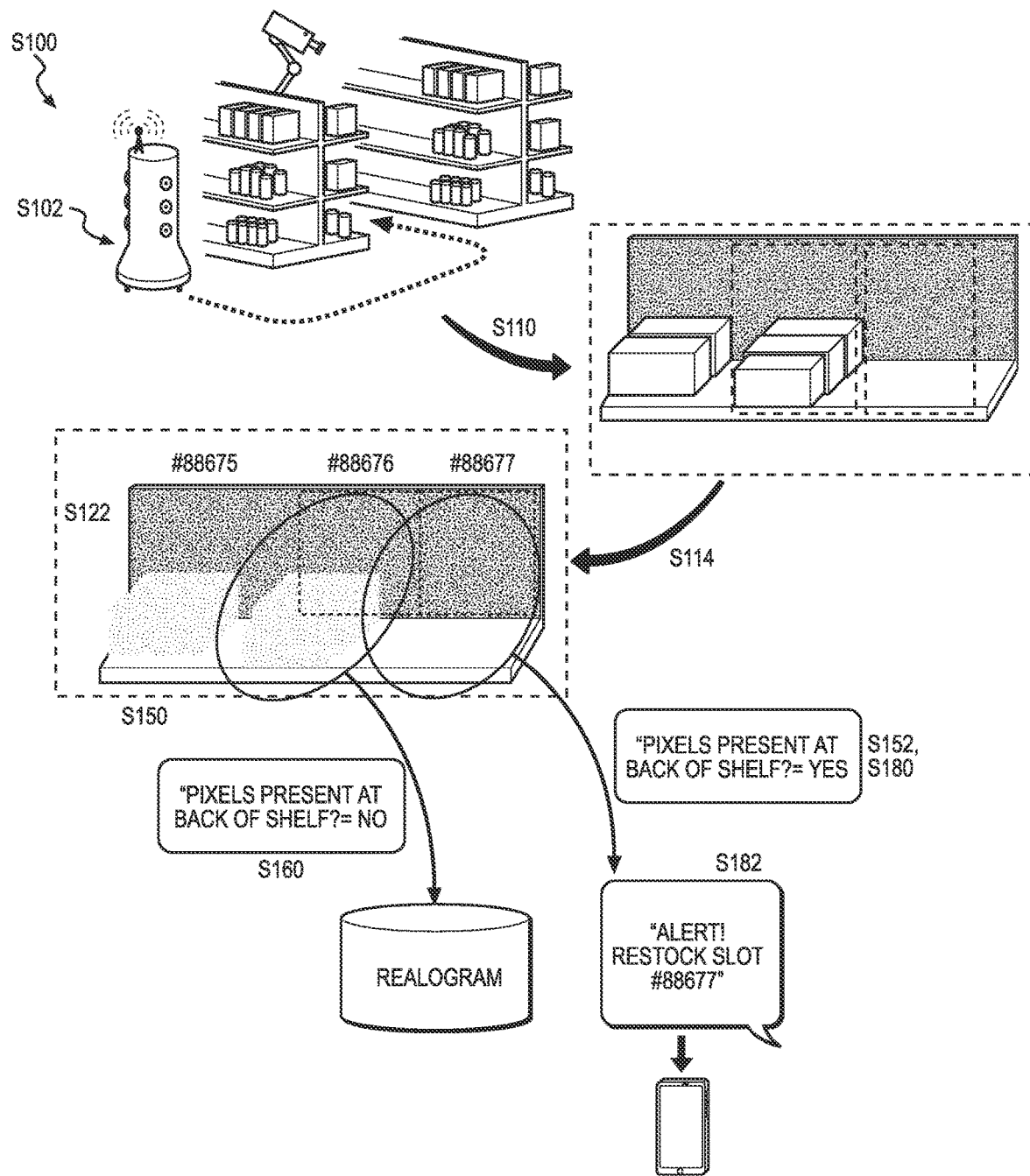
FIG. 1 is a flowchart representation of a method.

As shown in FIG. 1, a method S100 for maintaining inventory within a store includes: dispatching a robotic system to autonomously navigate throughout a store, to record images—photographic and/or depth—of inventory structures within the store during a scan cycle in Block S102; accessing an image (e.g., a color image, a depth image, a photographic image, a stereographic image) of an inventory structure captured by the robotic system during the scan cycle in Block S110; detecting a first shelving segment in a first inventory structure depicted in a first image in the set of images in Block S120; detecting a first shelf face on the first shelving segment; detecting a second shelf face above the first shelf face on the first shelving segment; defining a shelf volume based on the first and second shelf faces; locating the shelf volume in the depth image; defining a front-of-shelf plane extending through the first and second shelf faces; and detecting a set of pixels intersecting the shelf volume in the depth image in Block S152.

The method S100 also includes: for each pixel in the set of pixels in the shelf volume, calculating a minimum distance from the pixel to the front-of-shelf plane; identifying a maximum front-of-shelf plane distance for the set of pixels; normalizing the set of front-of-shelf plane distances for each pixel in the set of pixels in the shelf volume based on the maximum front-of-shelf plane; setting a maximum error (e.g., 2%); selecting a subset of pixels with normalized front-of-shelf plane distances nearest 1.0 (e.g., between 0.98 and 1.0 for a maximum error of 2%); calculating a best-fit plane through the subset of pixels in Block S150; and storing the best-fit plane as the back-of-shelf plane for the first shelf.

Figure 4:
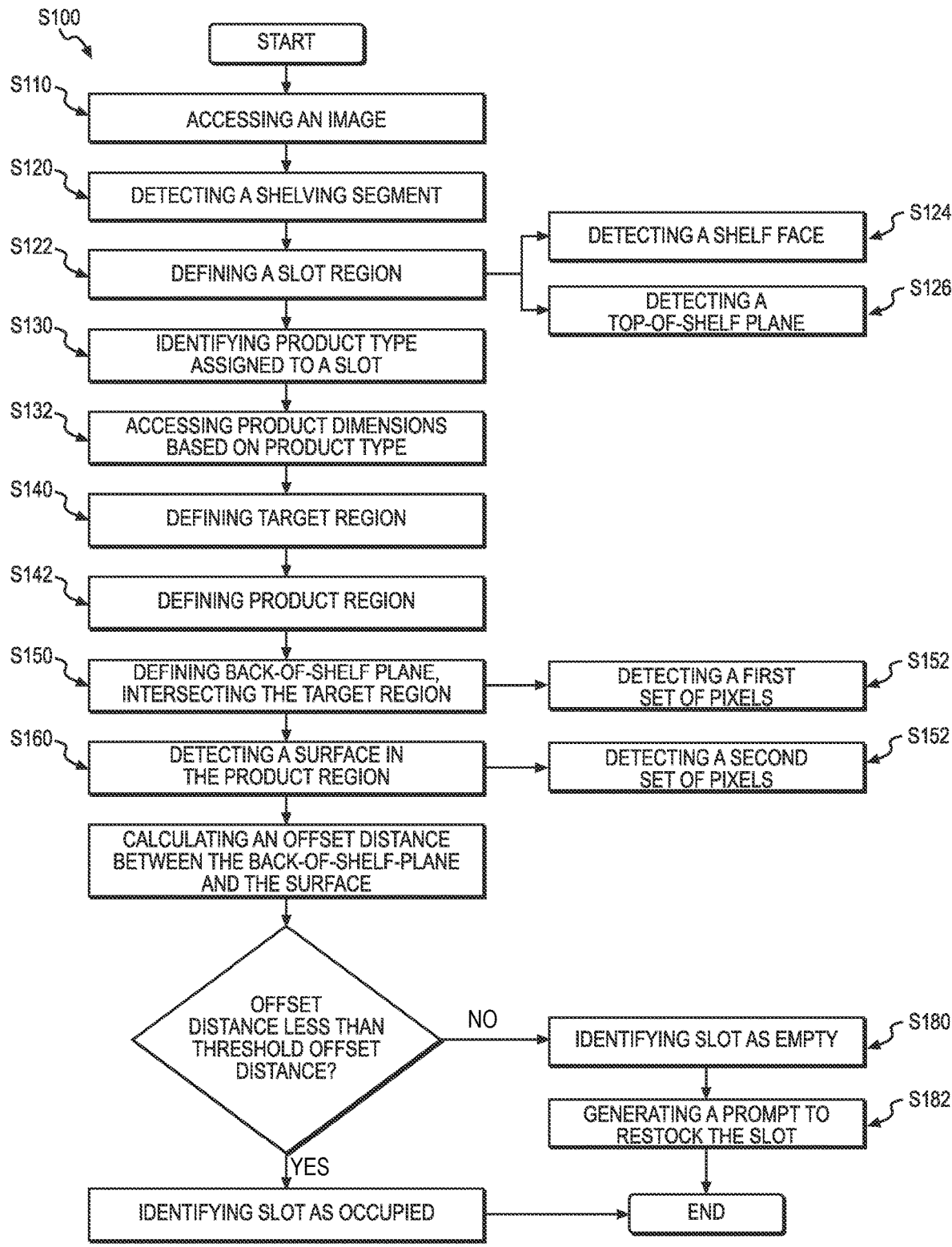
FIG. 4 is a flowchart representation of one variation of the method.

In one variation shown in FIG. 4, the method S100 can include identifying a target region in the slot based on the dimensions of a product assigned to the slot. In this variation, the method S100 can include: accessing a depth image of an inventory structure in Block S110; detecting a slot region of the depth image depicting a slot in Block S122; identifying a product type assigned to the slot in Block S130; accessing a product dimension of the product type in block S132; detecting a shelf face in the depth image in Block S124; defining a target region, offset above the shelf face by the product dimension, in the depth image in Block S140; defining a product region, between the shelf face and the target region, in the depth image in Block S142; defining a back-of-shelf plane intersecting the target region of the depth image in Block S150; detecting a depth of a surface within the product region in Block S160. The method S100 can further include, in response to the depth of the surface intersecting the back-of-shelf plane: identifying the slot as empty in Block S180; and generating a prompt to restock the slot with product units of the product type in Block S182.

Figure 3:
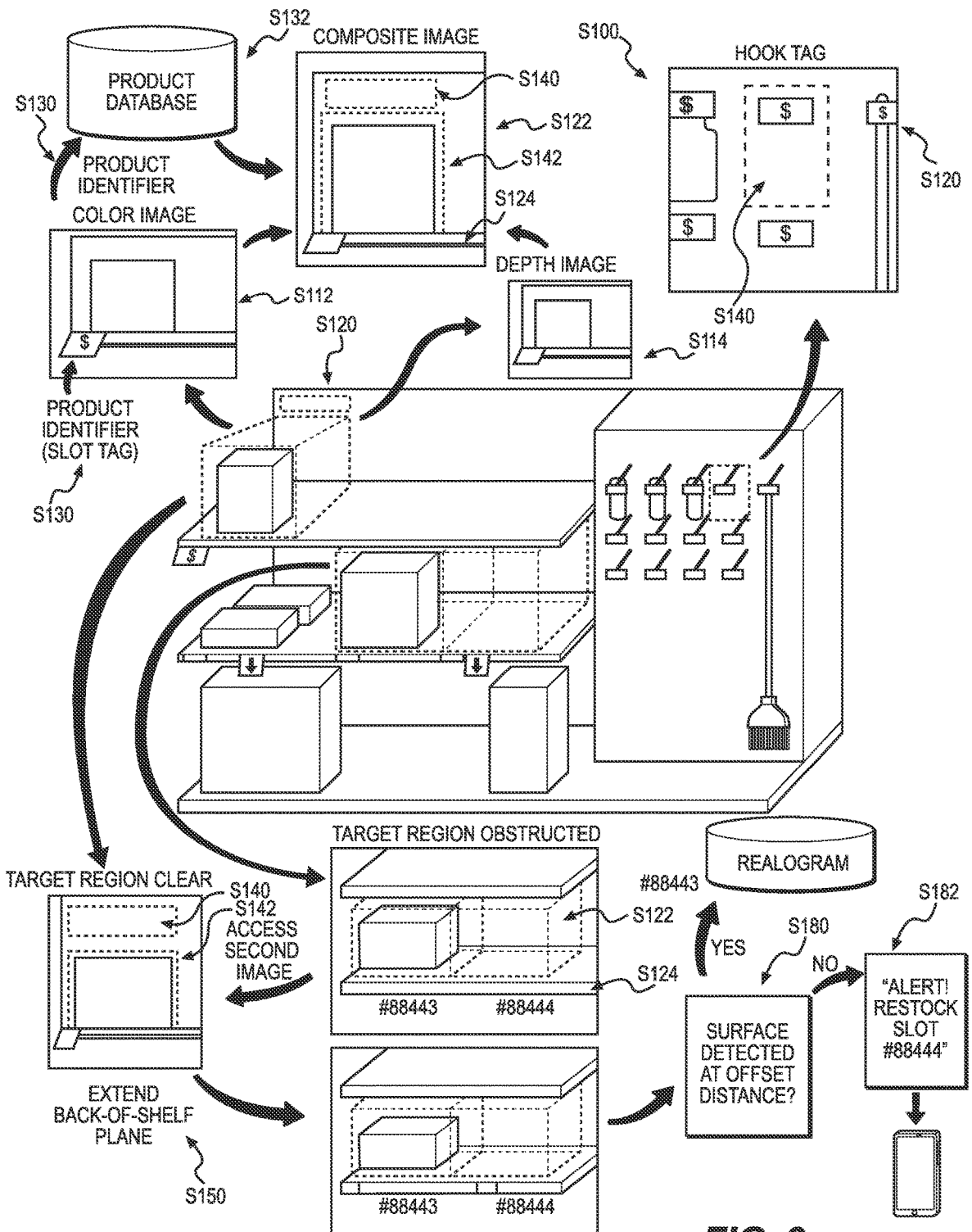
FIG. 3 is a flowchart representation of one variation of the method.

In another variation shown in FIG. 3, the method S100 can include: accessing a color image of an inventory structure in Block S112; accessing a depth image of an inventory structure in Block S114; detecting visual features of the inventory structure in a color image; detecting spatial features of the inventory structure in a depth image; detecting a slot tag in the color image in Block S120; defining a first slot region in the color image depicting a slot in the inventory structure proximal the slot tag in Block S122; defining a second slot region in the depth image depicting the slot in the inventory structure proximal the slot tag in Block S122; identifying a product type assigned to the slot in Block S130; accessing a product dimension of the product type in Block S132; defining a target region, offset from the slot tag by the product dimension, in the depth image in Block S140; defining a product region, between the slot tag and the target region, in the depth image in Block S142; defining a back-of-shelf plane intersecting the target region of the depth image in Block S150; and detecting a depth of a surface within the product region in Block S160. This variation of the method S100 can further include, in response to the depth of the surface intersecting the back-of-shelf plane: identifying the slot as empty in Block S180; and generating a prompt to restock the slot with product units of the product type in Block S182.

In yet another variation of the method S100, shown in FIG. 3, in which the product dimension is unavailable to define the target region in a first slot, the method S100 can include defining the target region based on the target region of a second slot, thereby verifying a target region in the first slot to verify the back-of-shelf plane in the slot and identify the presence or absence of a product unit in the slot. In this variation the method S100 can include: accessing a depth image of an inventory structure in Block S110; detecting a first slot region of the depth image depicting a first slot in Block S122; identifying a first product type assigned to the first slot in Block S130; accessing a first product dimension of the first product type in Block S132; detecting a first shelf face in the depth image in Block S124; defining a first target region, offset above the first shelf face by the first product dimension, in the depth image in Block S140; and defining a first product region, between the first shelf face and the first target region, in the depth image in Block S142. The method S100 can further include: detecting a second slot region of the depth image, external to the first slot region, depicting a second slot in Block S122; detecting a second shelf face in the depth image in Block S124; defining a second target region, offset above the second shelf face by the first product dimension, in the depth image in Block S140; defining a back-of-shelf plane intersecting the second target region of the depth image in Block S150; and detecting a second depth of a second surface within the second product region in Block S160. This variation of the method S100 can further include, in response to the second depth of the second surface intersecting the back-of-shelf plane: identifying the second slot as empty in Block S180; and generating a prompt to restock the second slot with product units of the second product type in Block S182.

In yet another variation, the method S100 can further include: accessing an image of an inventory structure; accessing a depth image of an inventory structure; detecting a first slot of a first inventory structure depicted in a first image in the set of images in Block S120; defining a slot volume designated for the slot; retrieving a back-of-shelf plane for the slot volume in Block S150; scanning the slot volume for pixels within a threshold distance from the back-of-shelf plane; detecting a presence of pixels at or near the back-of-shelf plane within the threshold distance of the back-of-shelf plane; identifying a product type associated with the slot as out-of-stock based on the presence of pixels; and flagging the slot for restocking with product units of the product type in Block S180.

2. Applications

Generally, Blocks of the method S100 can be executed by a computer system: to dispatch a robotic system to capture both 2D photographic and 3D depth images of inventory structures throughout a retail space (e.g., a grocery store); to define back-of-shelf planes of these inventory structures based on these images; to detect stock conditions of slots— in these inventory structures—depicted in these images based on visibility of their back-of-shelf planes in these images; and to assemble these image-based product type and stock condition data into a (more) complete representation of the total inventory state of the store, including positively identifying slots that are empty and positively identifying slots that are occupied based on visibility of the back-of-shelf plane in these images. In particular, the computer system can execute Blocks of the method S100: to positively identify a particular slot as empty in response to detecting features—that represent a known back-of-shelf surface—in an image of this slot; and to positively identify the particular slot as occupied (or "not empty") in response to detecting features in front of this known back-of-shelf surface.

For example, the computer system (e.g., a remote server, a computer network) can selectively dispatch a robotic system to image inventory structures throughout a store, such as: once per day prior to a scheduled restocking period during low-traffic or closed hours at the store; or on multiple occasions per day based on sale rate at the store. The computer system can then implement methods and techniques described in U.S. patent application Ser. No. 15/600, 527 to: identify a region of a photographic and/or depth image —captured by the robotic system during a scan cycle—depicting a slot in an inventory structure; define a slot volume designated for the slot; retrieve a back-of-shelf plane for the slot volume; project the slot volume into a depth image depicting the corresponding slot in the inventory structure; scan the slot volume for pixels within a threshold distance from the back-of-shelf plane (e.g., pixels likely representing a visible back-of-shelf in the slot); detect a presence of pixels at or near the back-of-shelf plane within the threshold distance of the back-of-shelf plane; verify whether a particular product type assigned to this slot is out-of-stock in this slot based on the presence of pixels (e.g., pixels representing a visible back-of-shelf plane); and prompt a store associate to restock the slot with product units of the product type accordingly.

Therefore, the computer system can execute Blocks of the method S100 to positively identify an empty slot based on alignment of depth data in a current scan of the slot with a back-of-shelf plane of the corresponding shelf (or entire shelving segment or shelving structure), all without necessitating placement of an optical fiducial or other indicator on the bottom or rear of this slot. More specifically, the computer system can execute Blocks of the method S100 to positively identify an empty slot without any modification of the slot, temporary or permanent installation of fiducials on the slot, or previous knowledge of slot locations or dimensions.

Generally as shown in FIGS. 1 and 3, the computer system can access a depth image depicting an inventory structure and segment the image into a set of slot regions. For a first slot, the computer system can access a product database to retrieve product dimensions of the product type assigned to the first slot. The computer system can then further segment the slot region into a target region and a product region, based on the product dimensions. For a standard slot on a standard shelf, the target region can be defined as a region of the slot offset from the lower edge of the slot (e.g., the shelf surface) by the product dimension. The target region is defined such that, within the target region, a clear line of sight exists to the back-of-shelf plane in all nominal operating conditions in the store (e.g., when the slot is properly stocked with the product type assigned to the slot, when the slot is partially stocked, when the slot is empty.) The unobstructed target region can serve as a control value for the slot, detectable in real time during a scan cycle by the computer system. The computer system can then detect a product offset distance of a surface in the product region and calculate an offset difference between the product offset distance of the surface in the product region and a back-of-shelf plane offset distance in the target region. If the offset difference is greater than a threshold value, the computer system can classify the slot as occupied. If the product offset difference is less than a threshold value, the computer system can classify the slot as empty. In this variation, the computer system applies a target region to each slot in the inventory structure based on the product dimensions of the product type assigned to that slot. In another variation, the computer system can apply a target region to each slot in the inventory structure based on the largest product dimension of the set of product types assigned to the set of slots in the inventory structure.

In another variation, the computer system can apply the foregoing methods and techniques using depth images in conjunction with color images. The computer system can access a color image and a depth image, captured concurrently, and depicting the same inventory structure. In the color image, the computer system can detect the slot tag, product features, and other visual information. In the depth image, the computer system can detect distances, surfaces, and locations of elements in 3D space. In one example, for a slot region in the inventory structure, the computer system can detect a product identifier located in the slot tag in the color image, and access information about the product type assigned to the slot, including dimensions, visual features, quantity of units assigned to the slot, etc., based on the product identifier. The computer system can then segment the slot into a target region and a product region based on the product dimensions. The computer system can then scan the target region for pixels to define the back-of-shelf plane for the slot, and then scan the product region for the location of a surface to detect a product unit present in the slot, or detect the absence of an object in the slot. In one variation of this example, the computer system can fail to identify a unit of a product type present in the slot by using product feature detection in the color image, and, in response, execute the forgoing methods using the depth image to verify the slot as occupied or empty.

In another example, the computer system can apply a target region to a non-standard slot (such as a hook tag, below shelf tag, or shelf pusher) based on the product attributes of the product assigned to that slot, or based on visual features detected in the image.

In yet another example, the computer system can store a back-of-shelf plane for a slot in a database and access the back-of-shelf plane during a subsequent scan. In the event the target region of the slot is obstructed during the subsequent scan, the computer system can access and apply a previously recorded back-of-shelf plane to execute the foregoing method steps to classify the slot as occupied or empty. In a related example, the computer system can access a set of previously recorded back-of-shelf planes for a slot to calibrate or update the back-of-shelf plane over multiple scan cycles to improve a confidence in the accuracy of the back-of-shelf plane, allowing the computer system to create a baseline for variation in the back-of-shelf plane and, in response to detecting deviation from this baseline, the computer system can generate a prompt to investigate the slot and transmit that prompt to a store associate.

The computer system can thus fuse 2D photographic image data and 3D depth image data to derive a stock condition of the slot—that is, whether slots are occupied by product—and prompt a store associate to restock this slot when product units are out-of-stock. Accordingly, the computer system can minimize errors in stock detection due to lighting conditions (e.g., varying colors and shadows) within the store, differing perspectives of cameras capturing the images of product units on inventory structures, and other types of noise that can occur in 2D photographic images. The computer system can then repeat this process for each other slot in the store in order to track inventory states of these slots and to generate and distribute restocking prompts to store associates accordingly, thereby enabling store associates to maintain a sufficient inventory state throughout the store over time.

The method S100 is described herein as executed by a computer system—remote from the robotic system—to derive inventory states of a slot on a shelf in an inventory structure from an image and radar scans of the inventory structure. However, Blocks of the method S100 can additionally or alternatively be executed by the remote computer system or other computer system within the store or locally by the mobile robotic system. Additionally or alternatively, Blocks of the method S100 can be executed by the computer system, etc. to derive inventory states of refrigeration units, produce displays, promotional displays, hang-down product displays, and/or other inventory structure types.

3. Robotic System

Figure 2:
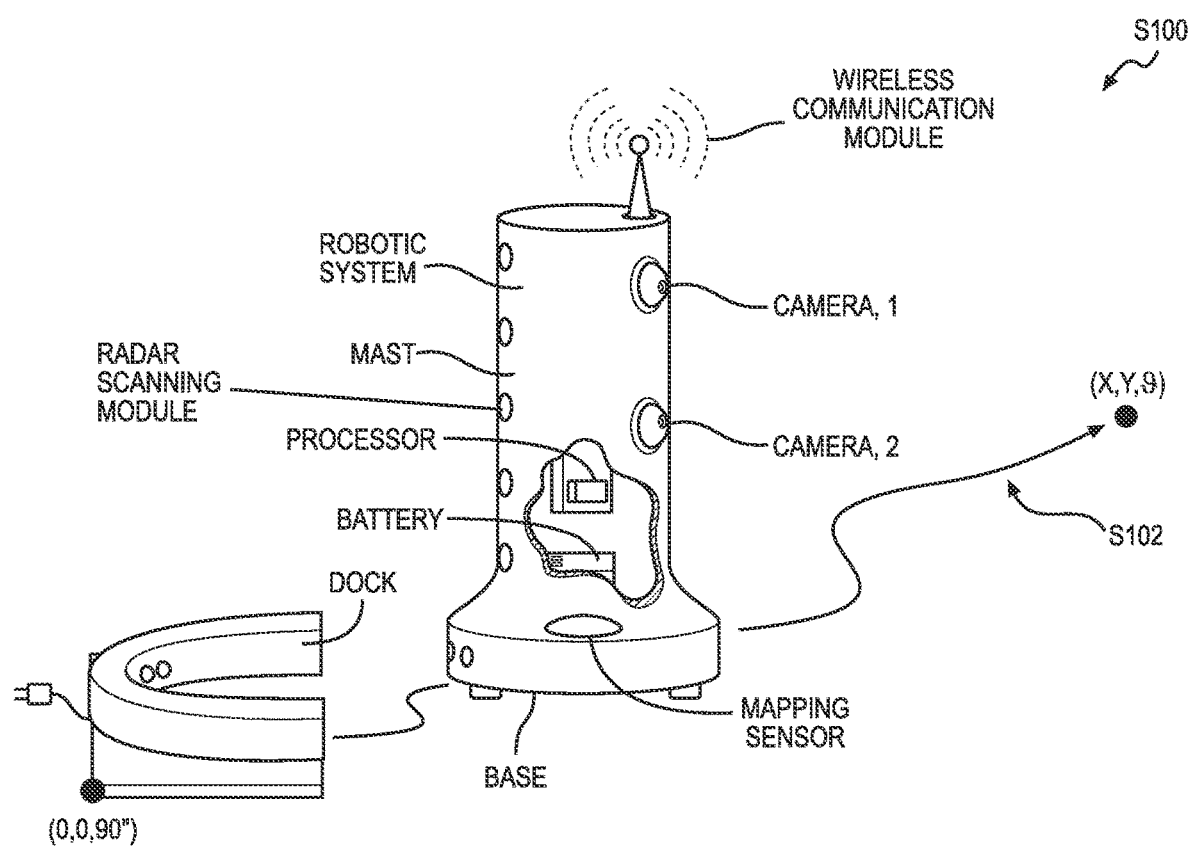
FIG. 2 is a schematic representation of a robotic system.

As shown in FIG. 2, a robotic system autonomously navigates throughout a store and records images—such as photographic images of packaged goods and/or depth images of inventory structures—continuously or at discrete predefined waypoints throughout the store during a scan cycle. Generally, the robotic system can define a network-enabled mobile robot configured to autonomously: traverse a store; capture photographic (e.g., color, black-and-white) and/or depth images of shelving structures, shelving segments, shelves, slots, or other inventory structures within the store; and upload those images to the computer system for analysis, as described below.

In one implementation shown in FIG. 2, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the robotic system; a mast extending vertically from the base; a set of photographic cameras arranged on the mast (e.g., RGB cameras configured to capture 2D color photographic images); and a wireless communication module that downloads waypoints and a master map of a store from a computer system (e.g., a remote server) and that uploads photographic images captured by the set of photographic cameras, depth images generated by the set of mapping sensors, and maps generated by the processor to the computer system, as shown in FIG. 1.

In this implementation, the robotic system can include the set of photographic cameras mounted statically to the mast—such as a first vertical array of (e.g., two, six) photographic cameras on a left side of the mast and a second vertical array of photographic cameras on the right side of the mast, as shown in FIG. 2—and generate a 2D color image—hereinafter a "photographic image." The robotic system can additionally or alternatively include articulable photographic cameras, such as: one photographic camera on the left side of the mast and supported by a first vertical scanning actuator; and one photographic camera on the right side of the mast and supported by a second vertical scanning actuator. The robotic system can also include a zoom lens, a wide-angle lens, or any other type of lens on each photographic camera. However, the robotic system can define any other form and can include any other subsystems or elements supporting autonomous navigating and image capture throughout a store environment.

In this implementation, the robotic system can include the set of mapping sensors (e.g., LIDAR sensor, stereoscopic color camera) mounted—statically or articulably—to the mast and generate a 3D image (e.g., a 3D point cloud, a stereoscopic color image)—hereinafter a "depth image."

In one example as shown in FIGS. 1 and 2, the computer system can: dispatch a mobile robotic system to automatically navigate along an inventory structure and capture a set of depth images depicting the inventory structure in Block S102; and access a depth image of the inventory structure captured by the mobile robotic system in Block S110.

In one variation, the robotic system can include a 3D stereoscopic color camera that captures a set of stereoscopic images including color data of objects and/or 3D depth information of surfaces within the store. In this variation, the computer system can implement Blocks of the method S100 to jointly process color and depth information in the set of stereoscopic images (e.g., both photographic and depth image components contained in the same stereoscopic image). In another variation, the computer system can extract color information from the set of stereoscopic images to generate and process 2D photographic images and extract depth information from the set of stereoscopic images to generate and process depth images.

Furthermore, multiple robotic systems can be deployed in a single store and can be configured to cooperate to image shelves and product units within the store. For example, two robotic systems can be deployed to a large single-floor retail store and can cooperate to collect images of all shelves and inventory structures in the store within a threshold period of time (e.g., within one hour). In another example, one robotic system is deployed on each floor of a multi-floor store, and each robotic system collects images of shelves and inventory structures on its corresponding floor. The computer system can then aggregate photographic and/or depth images captured by these robotic systems deployed in this store to generate a graph, map, table, and/or task list for managing distribution and restocking of product throughout the store.

Generally, the method is described herein as executed by a computer system: to define a back-of-shelf plane for different segments of customer-facing inventory structures within a store based on images captured by a mobile robotic system while autonomously navigating throughout a customer section of the store; to detect stock conditions in customer-facing slots on shelves of these customer-facing inventory structures based on the back-of-shelf plane and these images captured by the mobile robotic system; and to generate prompts to restock customer-facing slots with product units.

4. Hierarchy and Terms

A "product" is referred to herein as a type of loose or packaged good associated with a particular product identifier (e.g., a SKU) and representing a particular class, type, and varietal.

A "unit" or "product unit" is referred to herein as an instance of a product—such as one bottle of detergent, one box of cereal, or package of bottle water—associated with one SKU value.

A "product facing" is referred to herein as a side of a product (e.g., of a particular SKU or other product identifier) designated for a slot.

A "slot" is referred to herein as a section (or a "bin") of a customer-facing shelf on an "inventory structure" designated for storing and displaying product units of the product type (e.g., of the same SKU or CPU). An inventory structure can include an open, closed, humidity-controller, temperature-controlled, and/or other type of inventory structure containing one or more slots on one or more shelves.

A "shelf volume" is referred to herein as a 3dimensional volumetric space on a shelf that stores and displays product units of a set of product types. The shelf volume can extend laterally across a first shelving segment of an inventory structure, vertically between a first and second shelf face, and rearward from the first and second shelf faces.

A "slot volume" is referred to herein as a portion of the shelf volume that corresponds to a particular slot designated for storing and displaying product units of a particular product type associated with the slot.

A "back-of-shelf plane" is referred to herein as the rearmost (e.g., vertical) boundary of a shelf volume and/or a slot volume. A visible back-of-shelf plane of a shelf volume and/or slot volume may indicate that product units are not present on the shelf and/or in the slot, as such products may otherwise obscure some or all of the back-of-shelf plane of the shelf or slot if present.

A "store" is referred to herein as a (static or mobile) facility containing one or more inventory structures.

A "planogram" is referred to herein as a plan or layout for display of multiple product facings across many shelving structures, inventory structures, and other inventory structures within a store (e.g., across an entire store). In particular, the planogram can specify target product identification, target product placement, target product quantity, target product quality (e.g., ripeness, time to peak ripeness, maximum bruising), and product orientation data for product facings and groups of loose product units for fully-stocked shelving structures, inventory structures, and other inventory structures within the store. For example, the planogram can define a graphical representation of product units assigned to slots in one or more inventory structures within the store. Alternatively, the planogram can record textual product placement for one or more inventory structures in the store in the form of a spreadsheet, slot index, or other database (hereinafter a "product placement database").

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on images and/or other data recorded by the robotic system while autonomously executing scan cycles in the store.

The method S100 is described herein as executed by a computer system (e.g., a remote server, a computer network). However, Blocks of the method S100 can be executed by one or more robotic systems deployed in a retail space (or store, warehouse, etc.), by a local computer system (e.g., a local server), or by any other computer system —hereinafter a "system."

Furthermore, Blocks of the method S100 are described below as executed by the computer system to identify slots—on shelving structures within a store—that are not occupied by any product. However, the computer system can implement similar methods and techniques to identify empty cubbies or empty slots with spring-loaded pushers, refrigeration units, wall rack, freestanding floor racks, tables, or hot-food displays, etc.

5. Robotic System Deployment and Scan Cycle

Block S102 of the method S100 recites dispatching a robotic system to autonomously navigate throughout a store and to record photographic images and/or depth images of inventory structures within the store during a scan cycle. Generally, in Block S102, the computer system can dispatch the robotic system to autonomously navigate along a pre-planned sequence of waypoints or along a dynamic path and to record photographic and/or depth images of inventory structures throughout the store, as shown in FIG. 1.

5.1 Scan Cycle: Waypoints

In one implementation, the computer system: defines a set of waypoints specifying target locations within the store through which the robotic system navigates and captures images of inventory structures throughout the store during a scan cycle; and intermittently (e.g., twice per day) dispatches the robotic system to navigate through this sequence of waypoints and to record images of inventory structures nearby during a scan cycle. For example, the robotic system can be installed within a store, and the computer system can dispatch the robotic system to execute a scan cycle during store hours, including navigating to each waypoint throughout the store and collecting data representative of the stock state of the store in near real-time as patrons move, remove, and occasionally return product on, from, and to inventory structures within the store (e.g., shelving structures, refrigeration units, inventory structures, hanging racks, cubbies, etc.). During this scan cycle, the robotic system can: record photographic (e.g., color, black-and-white) images of each inventory structure; record depth images of all or select inventory structures; and upload these photographic and depth images to the computer system, such as in real-time or upon conclusion of the scan cycle. The computer system can then: detect types and quantities of packaged goods stocked in slots on these inventory structures in the store based on data extracted from these photographic and depth images; and aggregate these data into a realogram of the store.

The computer system can therefore maintain, update, and distribute a set of waypoints to the robotic system, wherein each waypoint defines a location within a store at which the robotic system is to capture one or more images from the integrated photographic and depth cameras. In one implementation, the computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("∂") relative to the origin of the store, based on an angular position of an aisle or shelving structure in the coordinate system. When executing a waypoint, the robotic system can orient to (e.g., within 1.5° of) the target orientation defined in the waypoint in order to align the suite of photographic and depth cameras to an adjacent shelving structure or inventory structure.

When navigating to a next waypoint, the robotic system can scan its environment with the same or other mapping sensor (e.g., a LIDAR sensor, as described above), compile depth scans into a new map of the robotic system's environment, determine its location within the store by comparing the new map to a master map of the store defining the coordinate system of the store, and navigate to a position and orientation within the store at which the output of the mapping sensor aligns—within a threshold distance and angle—with a region of the master map corresponding to the (x,y,∂) location and target orientation defined in this next waypoint.

In this implementation, before initiating a new scan cycle, the robotic system can download—from the computer system—a set of waypoints, a preferred order for the waypoints, and a master map of the store defining the coordinate system of the store. Once the robotic system leaves its dock at the beginning of a scan cycle, the robotic system can repeatedly sample its integrated mapping sensors (e.g., a LIDAR sensor) and construct a new map of its environment based on data collected by the mapping sensors. By comparing the new map to the master map, the robotic system can track its location within the store throughout the scan cycle. Furthermore, before navigating to a next scheduled waypoint, the robotic system can confirm completion of the current waypoint based on alignment between a region of the master map corresponding to the (x,y,∂) location and target orientation defined in the current waypoint and a current output of the mapping sensors, as described above.

However, the robotic system can implement any other methods or techniques to navigate to a position and orientation in the store that falls within a threshold distance and angular offset from a location and target orientation defined by a waypoint.

5.2 Scan Cycle: Dynamic Path

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc. For example, the computer system can dynamically generate its path throughout the store during a scan cycle to maximize a value of inventory structures or particular products imaged by the robotic system per unit time responsive to dynamic obstacles within the store (e.g., patrons, spills), such as described in U.S. patent application Ser. No. 15/347,689.

In this implementation, the robotic system can then continuously capture photographic images and/or depth images of inventory structures in the store (e.g., at a rate of 10 Hz, 24 Hz). However, in this implementation, the robotic system can capture images of inventory structures within the store at any other frequency during this scan cycle.

5.3 Scan Cycle Scheduling

In one implementation, the robotic system can: continuously navigate and capture scan data of inventory structures within the store; and, when a state of charge of a battery in the robotic system drops below a threshold state, return to a charging station to recharge before resuming autonomous navigation and data capture throughout the store.

Alternatively, the computer system can schedule the robotic system to execute intermittent scan cycles in the store, such as: twice per day during peak store hours (e.g., 11 AM and 6 PM on weekdays) in order to enable rapid detection of stock condition changes as patrons remove, return, and/or move products throughout the store; and/or every night during close or slow hours (e.g., 1 AM) to enable detection of stock conditions and systematic restocking of understocked slots in the store before the store opens the following morning or before a next peak period in the store.

However, the computer system can dispatch the robotic system to execute scan cycles according to any other fixed or dynamic schedule.

6. Image Access

Block S110 of the method S100 recites accessing an image of an inventory structure. Generally, the robotic system can return photographic and/or depth images recorded during a scan cycle to a remote database, such as in real-time during the scan cycle, upon completion of the scan cycle, or during scheduled upload periods. The computer system can then access these photographic and/or depth images from this database in Block S110, as shown in FIG. 1, before processing these images according to Blocks of the method S100 described below.

In one implementation, the computer system processes individual photographic images according to the method S100 in order to identify product units depicted in these individual images. Alternatively, the computer system can: stitch multiple photographic images into one composite image representing a greater length of one inventory structure (or greater length of multiple adjacent inventory structures); and then process these "composite" images according to methods and techniques described below.

For example, the computer system can deploy the robotic system to execute a scan cycle in the store. During this scan cycle, the robotic system can: autonomously navigate along a set of inventory structures in the store; capture a sequence of photographic images of the set of inventory structures; and return these photographic images to the computer system, such as in real-time or upon conclusion of the scan cycle. The computer system can then: access a first series of photographic images—in the sequence of photographic images—of an inventory structure captured by the mobile robotic system during the scan cycle; compile this first series of photographic images into a first image of the inventory structure; process this first image as described below; and repeat this process for each other series of photographic images depicting each other inventory structure in the store.

In another variation, the computer system can access an image from a fixed camera arranged within the store and oriented to capture an image (e.g., color images, photographic images, stereographic images, or depth images) of an inventory structure in the store. For example, the computer system can execute in Block S110 to access a depth image captured by a fixed camera mounted to a second inventory structure facing the inventory structure.

7. Image Segmentation and Shelf Detection

Block S120 of the method S100 recites detecting a set of shelves, in the inventory structure, depicted in the image. Generally, in Block S120, the computer system can extract features from the image and detect discrete shelves in the image based on these features.

In one implementation, the computer system: detects a set of features in the image; extracts—from this set of features—a first linear feature extending laterally across (substantially a full width of) the image; extracts—from this set of features—a second linear feature extending laterally across (substantially the full width of) the image and offset below the first linear feature by a distance approximating a common shelf thickness or a known shelf thickness of inventory structures throughout the store; and correlates the first linear feature and the second linear feature with a first shelf in the inventory structure. In this implementation, the computer system can similarly: extract—from this set of features—a third linear feature extending laterally across the image and offset above the first linear feature; extract—from this set of features—a fourth linear feature extending laterally across the image and offset below the third linear feature by a distance approximating the common or known shelf thickness; and correlate the third linear feature and the fourth linear feature with a second shelf in the inventory structure above the first shelf in the inventory structure. Additionally or alternatively, the computer system can detect a corresponding shelf face for each shelf (e.g., a vertical face on the shelf for locating slot tags).

In the foregoing example, the computer system can then define a first region of the image extending from proximal the first linear feature to proximal the fourth linear feature above and extending across the full width of the image cropped to the width of the inventory structure. The computer system can thus extract a first region of the first image —cropped or otherwise bounded by the inventory structure—corresponding to an accessible volume above the first shelf in the inventory structure—herein after a "shelf volume." The computer system can repeat this process for each other shelf in the inventory to generate or define a set of image regions, each representing an area or volume above one shelf in the inventory structure. The computer system can implement this process to define a shelf volume in a photographic image and then project the shelf volume into a corresponding depth image (or vice versa). Alternatively, the computer system can implement this process to define a shelf volume in a photographic image and separately in a depth image.

In one implementation, the computer system can segment the inventory structure based on a shelf type (e.g., horizontal shelves, cubbies, slots with spring-loaded pushers, wall rack, table, or other types of product organizers or displays) and implement the processes described above to define a shelf volume for the particular shelf type. However, the computer system can implement any other method or technique to segment an image of an inventory structure around a shelf represented in the image.

8. Product Detection

In one implementation, the computer system can implement the methods and techniques described in U.S. patent application Ser. Nos. 16/817,972 and 17/104,610, each of which is incorporated by reference herein in its entirety, to detect and identify product units arranged in slots on a shelf—or other types of product organization—of an inventory structure based on features extracted from a region of a photographic image depicting the inventory structure.

In particular, the computer system can: segment the image into subregions depicting slots on shelves; scan each subregion for features representative of product units; identify product units occupying these slots based on features extracted from subregions of the image depicting corresponding slots; and aggregate these derived data into a stock condition of the inventory structure. For example, the computer system can aggregate SKU or UPC identifiers and quantities of products thus detected in the image into a realogram of this inventory structure to reflect, for example, a presence of product units of a product type assigned to a slot, an actual quantity of the product units, and a quantity of misplaced product units occupying the slot (e.g., the "stock condition" of the slot).

In another implementation, the computer system can execute Blocks of the method S100 to identify the product assigned to the slot based on visual information detected in the slot tag in the color image. In this example, the method S100 can include: accessing a color image captured concurrently with the depth image in Block S110 and detecting a first slot tag corresponding to the first slot, a second slot tag corresponding to the second slot, and a third slot tag corresponding to the third slot, in the color image. The method S100 can further include: identifying the first product type based on the first slot tag corresponding to the first slot; identifying the second product type based on the second slot tag corresponding to the second slot; and identifying the third product type based on the third slot tag corresponding to the third slot.

Therefore, the computer system can identify the product type assigned to a particular slot in the inventory structure based on visual features detected in the color image of the inventory structure, such as by: detecting product identifying information in a region of the color image depicting a slot tag; and querying a product database for the product type based on the product identifying information.

The computer system can repeat these processes for each other slot detected on this shelf and can update the realogram (or spreadsheet or annotated image) to reflect the current stock condition of the shelf accordingly. The computer system can also repeat this process for each other customer-facing shelf detected on the inventory structure in order to update the realogram (or spreadsheet or annotated image) to reflect the current stock condition of the inventory structure as a whole.

9. Back-of-Shelf Plane Calculation

In one implementation, the computer system can calculate a back-of-shelf plane of a shelf of an inventory structure—or an individual slot or the inventory structure as a whole—to store as a reference in a realogram and/or a global stock record for detecting out-of-stock conditions—whether product units are present or not—of the product types arranged on the inventory structure, as shown in FIG. 1.

Generally, the computer system can: calculate a back-of-shelf plane for each segment of an inventory structure, such as for each shelf or set of shelves in a shelving segment in the inventory structure; and store the back-of-shelf plane—or set of back-of-shelf planes if different for each shelf—for each segment of the inventory structure, such as in an inventory structure database or a store realogram. The computer system can then monitor out-of-stock conditions of slots in this inventory structure based on visibility of the back-of-shelf plane in each of these; and generate prompts or notifications to prioritize restocking empty slots—that is, slots with high visibility of their back-of-shelf planes, which indicates absence of product units in these slots. Thus, the computer system can: characterize visibility of the back-of-shelf plane of a slot in the image of the inventory structure; flag the slot as empty if the full extent of the back-of-shelf plane of the slot is visible in the image; and otherwise note the slot as occupied and execute methods and techniques described below to identify the product units present in the slot based on features (e.g., colors, text, geometries) extracted from the region of this same image (e.g., a depth image) or another concurrent image (e.g., a 2D color image) depicting the slot.

9.1 Individual Shelf

Generally, the computer system can define a back-of-shelf plane for an individual shelf of an inventory structure, wherein the back-of-shelf plane is uniform above the shelf and across the full lateral width of a shelving segment within this inventory structure. The computer system can calculate the back-of-shelf plane of a shelf relative to a front shelf face of the shelf, such that the back-of-shelf plane measurement is independent of the position of the robotic system relative to the shelf as it captures images of the shelf during a scan cycle within the store. Accordingly, the computer system can store the back-of-shelf plane for the shelf—and therefore for all slots on the shelf—and detect out-of-stock conditions of product types arranged on the shelf based on a visibility of the back-of-shelf plane.

In one implementation, the computer system can: detect a first shelving segment of an inventory structure in a depth image and/or a photographic image; detect a first shelf face on the first shelving segment (e.g., a vertical face extending laterally across the full width of the first shelving segment and containing a row of slot tags); detect a second shelf face above the first shelf face on the first shelving segment; and define a shelf volume extending laterally across the full width of the first shelving segment, extending vertically between the first and second shelf faces, and extending rearward from the first and second shelf faces. The computer system can then: locate the shelf volume in a depth image of the inventory structure; detect a set of pixels intersecting the shelf volume in the depth image; and filter noise (e.g., aberrant pixels that do not accurately represent a scene of the image, such as in terms of color and/or exposure) from the set of pixels. In one example, the computer system can filter noise by removing a subset of pixels—within the shelf volume—located more than a maximum shelf depth (e.g., 80 centimeters) extending rearward from the first and second shelf faces.

Then, in one implementation, the computer system can define the back-of-shelf plane of the shelf volume by normalizing the remaining pixels intersecting the shelf volume. More specifically, the computer system can: define a front-of-shelf plane extending through the first and second shelf faces; and, for each pixel in the set of pixels in the shelf volume, calculate a minimum distance from the pixel to the front-of-shelf plane. The computer system can then: identify a maximum front-of-shelf plane distance for the set of pixels; normalize the set of front-of-shelf plane distances for each pixel in the set of pixels in the shelf volume based on the maximum front-of-shelf plane; set a maximum error (e.g., 2%); select a subset of pixels with normalized front-of-shelf plane distances nearest 1.0 (e.g., between 0.98 and 1.0 for a maximum error of 2%); and calculate a best-fit plane through this subset of pixels.

Additionally, in one variation, the computer system can calculate an error between the best-fit plane and all remaining pixels in the shelf volume. For example, the computer system can: calculate an error based on a sum of the squares of the front-of-shelf plane distances from each pixel to the best-fit plane; and, if this error is less than a threshold, store the best-fit plane as the back-of-shelf plane for the first shelf—and therefore for all slots on the first shelf. If this error is more than the threshold (for example, if some of the pixels used to calculate the best-fit plane likely represent objects on the shelf rather the back of the shelf), the computer system can: reduce the maximum error (e.g., to 1%); and repeat the steps described herein to calculate a revised best-fit plane until the error is less than the threshold and store the resulting best-fit plane as the back-of-shelf plane for the first shelf.

Alternatively, the computer system can define the back-of-shelf plane of the shelf volume by iteratively removing subsets of pixels intersecting the shelf volume and calculating a best-fit plane with the remaining pixels until an error threshold is met. More specifically, the computer system can: calculate a best-fit plane through all pixels in the shelf volume; calculate an error between the best-fit plane and all remaining pixels in the shelf volume (e.g., based on a sum of the squares of each distance of each pixel to the best-fit plane); and, if this error is less than a threshold, store the best-fit plane as the back-of-shelf plane for the first shelf—and therefore for all slots on the first shelf. If this error is more than the threshold (such as if some of the pixels used to calculate the best-fit plane likely represent objects on the shelf rather than the back of the shelf), the computer system can: define a first thin slice defining a thin volume parallel to the first and second shelf faces—extending across the shelving segment and between the first and second shelf faces, and extending up to a first offset distance (e.g., one millimeter) from the first and second shelf faces; remove all pixels within the first slice from the shelf volume; recalculate a best-fit plane through the remaining pixels; calculate an error between the revised best-fit plane and all remaining pixels in the shelf volume; and, if this error is less than a threshold, store the revised best-fit plane as the back-of-shelf plane for the first shelf. If this error is more than the threshold, the computer system can: define a second slice defining a thin volume parallel to the first and second shelf faces, extending across the shelving segment and between the first and second shelf faces and up to a second offset distance—greater than the first offset distance (e.g., two millimeters)—from the first and second shelf faces; and repeat the steps described herein to calculate a revised best-fit plane until the error is less than the threshold and store the resulting best-fit plane as the back-of-shelf plane for the first shelf.

9.2 Whole Shelving Segment

In another implementation, the computer system can define a back-of-shelf plane for a whole shelving segment—including a set of shelves—of an inventory structure, wherein the back-of-shelf plane is uniform across the set of shelves of the shelving segment. In order to define the back-of-shelf plane for the whole shelving segment, the computer system can implement the methods and techniques described above. Additionally or alternatively, the computer system can define a set of back-of-shelf planes if the back-of-shelf plane differs across the set of shelves of the shelving segment. In particular, the computer system can: define a front-of-shelf plane of the shelving segment; for each shelf in the shelving segment, detect a set of pixels intersecting the shelf volume exceeding a threshold for a minimum back-of-shelf depth (e.g., 10 centimeters relative to the front-of-shelf plane such that the computer system can detect all existing back-of-shelf planes, if varying across the shelves of the shelving segment); and repeat the process described herein to calculate a back-of-shelf plane. Accordingly, the computer system can store the back-of-shelf plane for the shelving segment—and therefore for each shelf and all slots on each shelf—and detect out-of-stock conditions of product types arranged on the shelf based on a visibility of the back-of-shelf plane.

In one implementation shown in FIG. 3, the computer system can extrapolate the back-of-shelf plane from a first slot in the shelving segment to a second slot in the shelving segment and detect a product present in the second slot based on the extrapolated back-of-shelf plane. In one variation in which the computer system anticipates a low level of variance in the back-of-shelf plane across the shelving structure, (e.g., a cereal aisle, a canned goods aisle, a paper goods aisle, or other highly uniform inventory structure) the computer system can detect a first back-of-shelf plane corresponding to a first slot in the shelving structure and detect a second back-of-shelf plane corresponding to a second slot in the shelving structure. The computer system can then project a back-of-shelf plane corresponding to the entire shelving structure based on the first back-of-shelf plane and the second back-of-shelf plane, resulting in a more accurate back-of-shelf plane across the inventory structure than an extrapolation of the back-of-shelf plane to the entire shelving structure based on a single slot in the shelving structure.

In another variation shown in FIG. 3, the computer system can extrapolate the back-of-shelf plane from a first slot and project the back-of-shelf plane to a second slot. For example, the computer system can: detect a second slot region of the depth image, adjacent the first slot region, representing a second slot in Block S122; identify a second product type assigned to the second slot in Block S130; access a second product dimension of the second product type in Block S132; define a second target region, offset above the first shelf face by the second product dimension, in the depth image in Block S140; and define a second product region, between the first shelf face and the second target region, in the depth image in Block S142. The computer system can then extrapolate the back-of-shelf plane to define a back-of-shelf plane intersecting the first target region and the second target region of the first depth image. Then, the computer system can calculate an offset distance between a second surface within the second product region of the depth image and the back-of-shelf plane and, in response to the offset distance between the second surface and the back-of-shelf plane exceeding a threshold difference, identify the second slot as occupied. Therefore, the computer system can identify and project a back-of-shelf plane common to the slots in the shelving segment to detect offset surfaces representing units of product types in slots in the shelving segment, or to detect empty or out-of-stock slots in the shelving structure.

In another variation, the inventory structure can be segmented into shelving segments with different back-of-shelf planes, such as a deep shelf configured to support product types of larger dimensions, and a shallow shelf configured to support product types of smaller dimensions. In this variation, the computer system can detect a first back-of-shelf plane located at a first depth corresponding to a deeper shelf, and a second back-of-shelf plane located at a second depth corresponding to a shallower shelf in an inventory structure. For example, in addition to executing Blocks of the method S100 described above to detect a second slot in the inventory structure and the product characteristics of a product assigned to that slot, the computer system can: define a second back-of-shelf plane intersecting the second target region of the depth image, separate from the first back-of-shelf plane in Block S150; and detecting a second depth of a second surface within the second product region in Block S160. In response to the second depth of the second surface intersecting the second back-of-shelf plane, the computer system can identify the second slot as empty; and generate a prompt to restock the second slot with product units of the second product type.

Therefore, the computer system can detect a different back-of-shelf plane in the first slot compared to the second slot in the inventory structure. The computer system can also extrapolate a back-of-shelf plane for a grouping of slots with common characteristics in the inventory structure, such as a first back-of-shelf plane for a first set of slots of a first depth, and a second back-of-shelf plane for a second set of slots of a second depth, both the first set of slots and the second set of slots arranged in a single shelving structure, a single aisle, or otherwise proximally arranged.

In yet variation example in which the target region of a second slot is obstructed in the depth image (e.g., by a shelf surface, by a hanging slot tag, by a promotional tag), the computer system can identify the obstructed target region in the second slot and extrapolate the back-of-shelf plane from a first slot to the second slot. For example, the computer system can: detect a first top edge of the first shelf face in the first depth image in Block S124; define a first top of shelf plane intersecting the first top edge of the first shelf face in Block S126; detect a second slot region of the first depth image, below the first slot region, representing a second slot in Block S122. In response to the first back-of-shelf plane in the second target region obstructed by the first shelf face in the first depth image, the computer system can: extend the first back-of-shelf plane from the first slot region to intersect the second slot region; detect a second top edge of the second shelf face in the first depth image in Block S124; define a second top of shelf plane intersecting the second top edge of the second shelf face; detect a second depth of a second surface, above the second top of shelf plane, within the second slot region in Block S160; calculate an offset distance between the second surface within the second slot region and the first back-of-shelf plane; and, in response to the offset distance between the second surface and the first back-of-shelf plane exceeding a threshold difference, identify the second slot as occupied.

Therefore, in a variation in which the target region of a second slot is obstructed in the image, the computer system can execute an alternative action to extrapolate the back-of-shelf plane of a first slot to the second slot, and thereby calculate the offset distance to a surface in the second slot, without direct line-of-sight to the back-of-shelf plane in the second slot through the second target region.

In another variation, the computer system can retrieve historical depth information (e.g., from images of previous scan cycles) to estimate a back-of-shelf plane for shelves in the same shelving segment and at the same depth. The computer system can implement the foregoing methods and techniques based on depth information contained in a region of the depth image that corresponds to these shelves.

For example, the computer system can execute Blocks of the method S100 to record a previous back-of-shelf plane in a database in Block S150 and retrieve the previous back-of-shelf plane measurement during a subsequent scan cycle in which the computer system detects the target region of a first slot as obstructed. In response to detecting the target region of the first slot as obstructed, the computer system can: access a second depth image of the inventory structure in Block S110; detect a second slot region of the second depth image depicting the first slot in Block S122; detect a second shelf face in the second depth image in Block S124; define a second target region, offset above the second shelf face by the first product dimension, in the second depth image in Block S140; define a second product region, between the second shelf face and the second target region, in the second depth image in Block S142; and identify the second target region obstructed in the second depth image in Block S140. In response to identifying obstruction of the second target region in the second depth image, the computer system can: access the first back-of-shelf plane from the database in Block S150; project the first back-of-shelf plane to intersect the second slot region depicting the first slot in Block S150; and detect a second depth of a second surface within the second product region in Block S160. In response to the second depth of the second surface intersecting the first back-of-shelf plane, the computer system can: identify the first slot as empty in Block 180; and generate a prompt to restock the first slot with product units of the first product type in Block S182.

In another implementation, the computer system can modify or improve the back-of-shelf plane corresponding to the inventory structure or shelving segment over time by detecting similarity between back-of-shelf plane measurements collected by the computer system at separate times. For example, the computer system can execute Blocks of the method S100 to increase a confidence value of the location of a previously recorded back-of-shelf plane by: accessing a second depth image of the inventory structure in Block S110; detecting a second slot region of the second depth image depicting the first slot in Block S122; detecting a second shelf face in the second depth image in Block S124; defining a second target region, offset above the second shelf face by the first product dimension, in the second depth image in Block S140; defining a second back-of-shelf plane intersecting the second target region of the second depth image in Block S150; calculating a second shelf depth distance between the second shelf face and the second back-of-shelf plane in the second slot region of the second depth image in Block S150; calculating an offset distance between the first shelf depth distance and the second shelf depth distance in Block S150; and, in response to the offset distance less than a threshold distance, increasing a confidence value associated with the first back-of-shelf plane in the database.

In another example, the computer system can detect a difference in the location of the back-of-shelf plane based on a difference in the back-of-shelf planes stored in the database by the computer system at separate times. The computer system can execute Blocks of the method S100 to decrease the confidence value of the location of a previously recorded back-of-shelf plane by, in response to calculating the difference between the first shelf depth distance and the second shelf depth distance as greater than the threshold value: decreasing the confidence value associated with the first back-of-shelf plane in the database; and generating a prompt to investigate the second slot.

In another example, the back-of-shelf plane can be altered over time. Alterations to the back-of-shelf plane can be intentional, such as installation of a new display element backing a shelf, a product dispenser, or a new shelving segment configuration, etc. In another example, the back-of-shelf plane can be identified, defined, or projected incorrectly, resulting in a systematic error. In a particular variation of this example, the back-of-shelf plane can be misidentified due to an incorrect product stocked in a slot. In this example, the target region of a first slot is based on a first product type defining a standard cereal box, assigned to the first slot. When the first slot is properly stocked with the correct product type, the computer system can detect the back-of-shelf plane within the target region in the first slot, (e.g., over the top of the standard cereal box) by implementing Blocks of the method S100 described above.

In this example, a second product type, defining a family-sized cereal box, is assigned to a second slot adjacent to the first slot. The family-sized cereal box can be larger in height than the standard cereal box (e.g., 10% larger in height.) In this example, the family-sized cereal box partially occupies the first slot, at the rear of the first slot, proximal the back-of-shelf plane. When the computer system attempts to detect the back-of-shelf plane in the target region of the first slot, the computer system can detect the surface of the family-sized cereal box and record that surface as the back-of-shelf plane, as this surface of the family-sized cereal box is partially within the target region of the first slot. The computer system can: access the database of previously-recorded back-of-shelf plane instances; and calculate a difference between the presently detected back-of-shelf plane and a previously recorded back-of-shelf plane. In response to the difference between the presently detected back-of-shelf plane (e.g., corresponding to the family-sized cereal box) of the first slot and a previously recorded back-of-shelf plane of the first slot exceeding a threshold value, the computer system can: designate the presently detected back-of-shelf plane in the region of the image depicting the slot as an error; decrease the confidence level of the back-of-shelf plane for the first slot; and generate and transmit a prompt to a store associate to investigate the first slot. In another example, the computer system calculates the difference between the presently detected back-of-shelf plane and a first, most recently recorded back-of-shelf plane. In response to calculating the difference exceeding a threshold difference, the computer system can apply a second previously recorded back-of-shelf plane with a confidence value greater than a threshold confidence value to the first slot; and execute the previously described Blocks of the method S100 to classify the first slot as occupied or empty.

The computer system can repeat the foregoing Blocks of the method S100 to modify the confidence value of the back-of-shelf plane positions for an individual slot, an individual shelf, an entire shelving structure segment, or an inventory structure as a whole. The computer system can also collect back-of-shelf plane location measurements from multiple locations in an inventory structure over time to further reinforce the confidence value of the back-of-shelf plane location. By reinforcing the confidence of the back-of-shelf plane location over time, the computer system can reduce the threshold error of the location of the back-of-shelf plane. Therefore, the computer system can repeatably detect depths of surfaces in the inventory structure deviating from the back-of-shelf plane with high confidence, and thereby reduce the incidence of false-positive out-of-stock detections in the inventory structure when a surface is detected proximal, but not intersecting, the back-of-shelf plane.

In another variation, the computer system can define a set of back-of-shelf planes for a whole shelving segment, wherein the back-of-shelf plane can vary for different portions of the shelving segment. For example, a bottom shelf of the shelving segment may have a lesser depth than other shelves due to a structure of the shelving segment (e.g., a portion of the bottom shelf can include mounting structures and/or weighting elements to prevent the shelving segment from moving or toppling over). In this example, the computer system can segment the shelving segment and implement the methods and techniques described herein to define a back-of-shelf plane for each segment of the shelving segment.

Additionally or alternatively, the computer system can implement the methods and techniques described above to define a back-of-shelf plane for a whole inventory structure—including a set of shelving segments including a set of shelves—and store the back-of-shelf plane for the whole inventory structure. Alternatively, the computer system can define a set of back-of-shelf planes for a whole inventory structure—including a set of shelving segments including a set of shelves that can have differing back-of-shelf planes—and store the set of back-of-shelf planes for the whole inventory structure. Accordingly, the computer system can detect out-of-stock conditions of product types arranged on the inventory structure based on a visibility of the back-of-shelf plane or planes.

9.3 Individual Slot

Generally, the computer system can define a slot based on features detected in an image, such as shelf faces, top of shelf planes, slot tags, or other features of the inventory structure. In one implementation, the computer system can implement the methods and techniques described above to define a back-of-shelf plane for an individual slot on an inventory structure. Accordingly, the computer system can store the back-of-shelf plane for the individual slot and detect out-of-stock conditions of the product type associated with the individual slot based on a visibility of the back-of-shelf plane.

In one example in which the computer system defines a target region of a standard slot describing a unit of a product type sitting on a shelf, the computer system can execute Blocks of the method S100 to define the region of the standard slot as the region of the depth image above the slot tag; and define the first target region, offset from the first slot tag by the first product dimension, in the first depth image. In one variation, the target region is further bounded by a shelf face at the upper boundary of the slot. In another variation in which the slot is located on a top shelf of an inventory structure, the computer system can calculate the upper boundary of the target zone: proportional to the product dimension (e.g., no % of a standard height of the product type); or based on a predefined slot height (e.g., a stored height of a backing member of the shelving segment).

In another implementation, the computer system can define boundaries of a slot and the target region of the slot based on features detected in the image. For example, the computer system can detect a second shelf face, above a first shelf face defining a lower boundary of the slot, and define the target region of the slot offset above the first shelf face by the first product dimension and extending to the second shelf face, in the first depth image.

Therefore the computer system can constrain the region of the image in which to scan for the back-of-shelf plane based on features detected in the image, and thereby limit errors in back-of-shelf plane or product surface detection. In another example in which the top of the slot is unbounded by a physical feature, the computer system can implement a virtual upper boundary of the target region in the slot in response to detecting absence of a physical feature (e.g., a top shelf of an inventory structure) constraining the target region in the image.

9.4 Back-of-Shelf Plane Over Multiple Scan Cycles

In one variation, the computer system can implement the methods and techniques described above to define a back-of-shelf plane for an individual shelf—or whole shelving segment or individual slot—for each scan cycle executed by the robotic system within the store. The computer system can then: compile the back-of-shelf planes calculated for each shelf—or whole shelving segment or individual slot, etc.—over multiple scan cycles; and calculate an average back-of-shelf plane (or a weighted average with the newest back-of-shelf plane assigned the greatest weight).

Therefore, because different combinations of slots within an inventory structure may be empty during multiple scan cycles completed by the mobile robotic system over time, the computer system can: compile the back-of-shelf planes calculated for different regions of backs of shelves that are visible in images captured over these multiple scan cycles in order to generate a more complete and comprehensive representation of the back-of-shelf planes of each shelf, shelving segment, or slot, etc.

In another variation, if the back-of-shelf plane of an individual shelf is not visible in images captured by the robotic system during a scan cycle within the store, the computer system can derive a back-of-shelf plane for the shelf based on the back-of-shelf plane for adjacent shelves—derived from images captured during the same scan cycle or from previous scan cycles (e.g., historical back-of-shelf information). Similarly, the computer system can derive a back-of-shelf plane for a whole shelving segment or an individual slot based on the back-of-shelf plane for adjacent shelving segments or adjacent slots, respectively.

10. Out-of-Stock Detection

The computer system can then identify out-of-stock conditions of slots in shelves—or other segments—of an inventory structure depicted in a photographic image and/or depth image based on the back-of-shelf plane (or planes), as shown in FIG. 1.

In one implementation, the computer system can detect an out-of-stock condition of products in slots on an inventory structure based on a visibility of the back-of-shelf plane of the slots—more specifically, a back-of-shelf plane of a slot that is visible (e.g., a large portion of the back-of-shelf plane, a bottom corner edge of the back-of-shelf plane) in photographic and/or depth images of the inventory structure is an indicator that products are not present in the slot (that would otherwise obscure the back-of-shelf plane from view). In particular, the computer system can: detect a slot on an inventory structure in a photographic and/or depth image; retrieve a back-of-shelf plane for the slot; detect a visibility of the back-of-shelf plane in the depth image of the slot; confirm an absence of product units in the slot based on the visibility of the back-of-shelf plane of the slot; and flag the slot for restocking by an associate within the store. The computer system can then repeat this process for each other slot detected on inventory structure in the image.

The computer system can then update a global stock record for the store with the out-of-stock condition of the slots of the inventory structure. The computer system can additionally or alternatively: annotate the photographic and/or depth image directly with a flag—including a product type associated with the slot and the out-of-stock condition—at the location of the slot depicted in the image; and/or annotate the realogram of the inventory structure to reflect the out-of-stock condition of the slot.

10.1 Individual Slot

In one implementation, the computer system can identify an out-of-stock condition of an individual slot of an inventory structure depicted in a photographic and/or depth image. In particular, the computer system can: access a photographic and/or depth image of an inventory structure; detect a shelf on the inventory structure; detect a shelf face (e.g., based on positions of a set of slot tags); detect a first slot (e.g., based on a position of a slot tag in the photographic and/or depth image and/or a planogram indicating a location of the slot within the store); define a slot volume representing a volumetric space designated for the slot (e.g., extending laterally across substantially a full width of the slot, vertically between the shelf face and an adjacent shelf face, and rearward from the shelf face); retrieve a back-of-shelf plane for the slot volume (or for the shelf or shelving segment containing the slot, for example, from a realogram or a stock record); scan the slot volume for pixels within a threshold distance from the back-of-shelf plane (e.g., 10 millimeters); detect a presence of pixels at or near the back-of-shelf plane within the threshold distance of the back-of-shelf plane; identify a product type associated with the slot as out-of-stock based on the presence of pixels; and flag the slot for restocking with product units of the product type.

Alternatively, the computer system can: detect an absence of pixels at or near the back-of-shelf plane within the threshold distance of the back-of-shelf plane; and identify the product type associated with the slot as in-stock based on the absence of pixels. The computer system can then update the realogram or global stock record with the stock condition of the slot.

10.2 Normalization Gradient

In another implementation, the computer system can: scan the slot volume for pixels representing products present in the slot and/or surfaces within the slot (e.g., the back-of-shelf plane, a shelf surface); implement the normalization method and techniques described above to generate a normalized gradient of the pixels; and detect the presence of pixels at or near the back-of-shelf plane based on the normalized gradient of the pixels. In particular, the computer system can detect pixels within a threshold from the back-of-shelf plane (e.g., +/−0.02 for a range between 0.98 and 1.02, in which 1.0 represents the back-of-shelf plane); identify a product type associated with the slot as out-of-stock based on the presence of pixels falling within the threshold from the back-of-shelf plane (e.g., the rearmost pixels likely represent a visible back-of-shelf plane); and flag the slot for restocking with product units of the product type in response to identifying the product type as out-of-stock in the slot. Alternatively, the computer system can: detect an absence of pixels at or near the back-of-shelf plane within the threshold of the back-of-shelf plane; and identify the product type associated with the slot as in-stock based on the absence of pixels. The computer system can then update the realogram or global stock record with the stock condition of the slot.

10.3 Bottom Inner Shelf Corner

Additionally or alternatively, the computer system can scan the slot volume for pixels along a bottom rear edge (e.g., a bottom inside corner) of the slot. In response to detecting a continuous and contiguous linear row of pixels—in the current image of the inventory structure—that fall within a threshold distance of and are parallel to the back-of-shelf plane of the corresponding shelf, the computer system can identify the slot as empty. In particular, the computer system can: detect a presence of pixels—such as across a continuous width—within a threshold distance (e.g., 10 millimeters) of the back-of-shelf plane; identify the pixels as a bottom rear edge of the slot; identify a product type associated with the slot as out-of-stock in response to identifying the pixels as the bottom rear edge of the slot; and flag the slot for restocking with product units of the product type. Alternatively, the computer system can: detect an absence of pixels within the threshold distance of the back-of-shelf plane; and identify the product type associated with the slot as in-stock based on the absence of pixels. The computer system can then update the realogram or global stock record with the stock condition of the slot.

10.4 Back-of-Shelf Plane Area

Additionally or alternatively, the computer system can: calculate an area ratio of the back-of-shelf plane of a slot that is visible in the current image (e.g., based on a ratio of pixels in the slot volume in the current image that fall on the back-of-shelf plane of the slot); and then identify the slot as empty if this area ratio exceeds a threshold (e.g., 95%).

In one implementation, for a product type defining a small volume relative to the slot volume of its assigned slot, a portion of the back-of-shelf plane may be visible even if the slot is fully stocked with product units of this product type. For example, candles may exhibit heights less than the height of the slot, thus exposing the back-of-shelf even if the candles are stocked across the full width and/or depth of the slot. In this implementation, the computer system can: detect a slot in a photographic and/or depth image; define a slot volume around the first slot; retrieve a back-of-shelf plane for the slot volume; project the back-of-shelf plane into the first slot volume in the depth image; isolate a set of pixels in the depth image that falls within the slot volume; generate a first count of pixels that fall within a threshold distance (e.g., ten millimeters) from the back-of-shelf plane; and generate a second count of pixels that fall outside the threshold distance from the back-of-shelf plane in the slot volume. The computer system can then calculate a ratio of the first count to the second count. Thus, if this ratio is high (e.g., greater than 0.95), then a high proportion of the back-of-shelf plane at the slot is visible, and the first slot is (very likely to be) empty (e.g., devoid of product units). Accordingly, the computer system can flag the first slot for restocking. Otherwise, the computer system can predict that objects are present in the first slot and that the first slot is therefore not empty. The computer system can then update the realogram or global stock record with the stock condition of the slot.

Therefore, the computer system can: detect absence of pixels in the (depth or 3D) image occurring at more than the threshold distance from the back-of-shelf plane; identify the slot as out-of-stock based on absence of these pixels; and flag the slot for restocking with product units of the product type assigned to this slot. For example, the computer system can update the realogram or a global stock record of the store with the "empty" stock condition of this slot.

10.5 Slot Not Empty

Alternatively, if the back-of-shelf checks for a slot described above fail, the computer system can predict presence of a product unit in the slot. Accordingly, the computer system can implement product recognition techniques to identify the product type of one or more product units present on the shelf, such as based on depth and/or color contained in this depth image or corresponding color image.

For example, the computer system can: access a photographic and/or depth image of an inventory structure; detect a shelf on the inventory structure; detect a shelf face (e.g., based on positions of a set of slot tags); detect a first slot (e.g., based on a position of a slot tag in the photographic and/or depth image and/or a planogram indicating a location of the slot within the store); define a slot volume representing a volumetric space designated for the slot (e.g., extending laterally across substantially a full width of the slot, vertically between the shelf face and an adjacent shelf face, and rearward from the shelf face); retrieve a back-of-shelf plane for the slot volume (or for the shelf or shelving segment containing the slot from a realogram or a stock record); scan the slot volume for pixels more than a threshold distance from the back-of-shelf plane (e.g., 10 millimeters); and isolate pixels located more than the threshold distance from the back-of-shelf plane in this slot. The computer system can then implement methods and techniques described in U.S. patent application Ser. No. 15/600, 527, which is incorporated by reference herein in its entirety, to identify a product type present in this slot based on color and/or geometry data contained in these pixels.

Conversely, the back-of-shelf checks for a slot described above can be implemented in response to the product recognition techniques failing. For example, the computer system can: access a first color image of the inventory structure in Block S110; detect the first slot region in the first color image in Block S122; access a first product feature representing the first product type in Block S132; and scan the first slot region in the first color image for the first product feature. In response to detecting absence of the first product feature in the first slot region, the computer system can then: calculate an offset distance between the first surface within the first product region and the back-of-shelf plane in Block S160; and, in response to the offset distance falling below a threshold distance, identify the first slot as empty. Therefore, in response to failure to detect a set of product features in the slot, the computer system can implement Blocks of the method S100 including scanning for and detecting pixels in the image, and segmenting and detecting features in the depth image to define the back-of-shelf plane for a particular slot.

Alternatively, in one implementation, the back-of-shelf checks for a slot described above can be implemented in conjunction with product or feature detection techniques. For example, the computer system can: access a first color image captured concurrently with the first depth image; detect a first slot tag associated with the first slot in the first color image; detect a first product identifier in the first slot tag in the first color image; and identify the first product type of the first slot based on the first product identifier.

Therefore, the computer system can detect the product assigned to a particular slot based on the product identifier detected in a slot tag in the color or photographic image. The computer system can implement visual detection techniques or depth detection techniques to classify a slot as either occupied or empty based on the conditions in the store, the images available, or the failure of a technique to correctly classify a slot.

10.6 Individual Shelf

In another implementation, the computer system can implement the methods and techniques described above to detect out-of-stock conditions for an entire shelf—and therefore for each slot on the shelf—of an inventory structure based on a visibility of the back-of-shelf plane of the entire shelf. Accordingly, the computer system can flag particular product types arranged in the slots on the shelf for restocking by an associate within the store.

10.7 Whole Inventory Structure

In another implementation, the computer system can implement the methods and techniques described above to detect out-of-stock conditions for an entire inventory structure. For example, the computer system can: detect a set of shelves—or segments with varying types of shelves—of the inventory structure; retrieve a back-of-shelf plane (or planes) for the inventory structure; and detect a visibility of the back-of-shelf plane (or planes) in a depth image of the inventory structure. Accordingly, the computer system can detect out-of-stock conditions of product types arranged on each of the shelves—or segments—across the entire inventory structure and flag particular product types on the inventory structure for restocking by an associate within the store.

10.7.1 Target Region Based on Maximum Product Dimension

In another implementation, the computer system can apply a uniform target region to all slots in a particular inventory structure based on a maximum product dimension (e.g., maximum product height) of all products assigned to the slots in the particular inventory structure.

For example, the computer system can execute Blocks of the method S100 to compare product dimensions between two slots in the inventory structure, including: detecting a second slot region of the depth image, below the first slot region, representing a second slot; identifying a second product type assigned to the second slot; and accessing a second product dimension of the second product type, different from a first product dimension of a first product assigned to a first slot; and defining the first target region in the first slot, offset above the first shelf face by the greater of the first product dimension and the second product dimension.

In another example, the computer system can execute Blocks of the method S100 to access product dimensions for the set of products assigned to the set of slots in an inventory structure and calculate the maximum product dimension for the set of slots. In this example, the method S100 can include: detecting a third slot region of the first depth image depicting a third slot in Block S110; identifying a third product type assigned to the third slot in Block S130; accessing a third product dimension of the third product type in Block S132; generating a list of product dimensions rank-ordering the first product dimension, the second product dimension, and the third product dimension from greatest to least; accessing the greatest product dimension in the list of product dimensions; and defining the second target region, offset above the second shelf face by the greatest product dimension, in the first depth image.

Therefore, the computer system can access a set of product dimensions corresponding to products assigned to the slots depicted in the accessed image and calculate the maximum product dimension to define a target region for each slot in the inventory structure. This uniform application of target regions across the inventory structure can reduce computing load on some images of some inventory structures, while still preserving a high degree of accuracy of detection of the back-of-shelf plane position in the image.

11 Alternative Slot and Shelving Configurations

The computer system can be configured to define a back-of-shelf plane for a variety of alternate slot configurations common to a retail store to hold specialized or non-uniform products, particularly configurations in which the slot region does not define a standard slot on a shelf. The computer system can be configured to define a back-of-shelf plane for: a slot in which the product hangs from a hook; a slot in which the slot tag is in a non-standard location, such as a below shelf tag; or a slot in which an additional element other than the unit of the product type is present in the slot, such as a slot pusher or can dispenser.

11.1 Wall Rack

In one variation, the computer system can detect out-of-stock conditions for product types configured to hang from hooks in a wall rack area on an inventory structure. For example, an inventory structure can have a segment consisting of a vertical plane with a set of hooks and/or hanging racks protruding outward from the vertical plane positioned at various intervals, and product units can hang vertically along a depth of the hook. The computer system can define a back-of-shelf plane for a first slot in a wall rack area and store the back-of-shelf plane for all other slots in the wall rack area.

For example, the computer system can execute Blocks of the method S100 to: define the second slot region of the first depth image below the first slot tag; and define the first target region, offset from the first slot tag by the first product dimension from the first slot tag, in the first depth image.

In one variation of this example shown in FIG. 3, the computer system can define the target region offset from the slot tag by the product dimension below the slot tag to define a hook tag slot, in which the product hangs from a hook.

In order to define the back-of-shelf plane for a wall rack area, the computer system can: detect a slot tag in a depth image and/or a photographic image; detect a first shelf face on the first shelving segment (e.g., a vertical face where, for example, slot tags for a first shelf are located); identify a product type based on a product identifier on the slot tag; identify the product type as a hanging product based on the product identifier (and/or based on a planogram or a detected absence of a shelf face surrounding the slot tag); detect a slot for the product type (e.g. a rectangular area of a certain height and width located below the slot tag); and define a slot volume representing a volumetric space designated for the product type. The computer system can then: locate the slot volume in a depth image of the inventory structure; detect a set of pixels intersecting the shelf volume in the depth image; implement the methods and techniques described above to define the back-of-shelf plane based on the set of pixels intersecting the shelf volume; and store the back-of-shelf plane for the slot tag (e.g., in a realogram and/or stock record)—and for all other slot tags in the wall rack area.

In order to detect an out-of-stock condition for a slot in a wall rack area, the computer system can: detect a slot tag in a photographic and/or depth image of an inventory structure; identify a product type based on a product identifier on the slot tag; identify the product type as a hanging product based on the product identifier (and/or based on a planogram or a detected absence of a shelf face surrounding the slot tag); detect a slot for the product type (e.g. a rectangular area of a certain height and width located below the slot tag); define a slot volume representing a volumetric space designated for the product type; retrieve a back-of-shelf plane for the slot volume (e.g., based on the product identifier); scan the slot volume for pixels within a threshold distance from the back-of-shelf plane (e.g., 10 millimeters); detect a presence of pixels at or near the back-of-shelf plane within a threshold distance of the back-of-shelf plane; identify the product type associated with the slot as out-of-stock based on the presence of pixels; and flag the slot for restocking with product units of the product type. Alternatively, the computer system can: detect an absence of pixels at or near the back-of-shelf plane within the threshold distance of the back-of-shelf plane; and identify the product type associated with the slot as in-stock based on the absence of pixels. The computer system can then update the realogram or global stock record with the stock condition of the slot.

Additionally or alternatively, the computer system can: calculate a ratio of the pixels contained within the slot volume in the image that fall within the threshold distance of the back-of-shelf plane (e.g., pixels that are along or very near to the back-of-shelf plane) and detect an out-of-stock condition of the slot volume based on the ratio exceeding a ratio threshold, which can be predetermined for each product type based on geometrical features of a product unit of the product type. For example, a broom hanging in a wall rack area of an inventory structure can have a dimensionally large slot volume yet occupy a small ratio of the slot volume due to its geometry (e.g., a long, thin cylindrical handle attached to a trapezoidal broomhead). Thus, the product can be fully stocked yet a high ratio of the back-of-shelf plane can be visible. Accordingly, the ratio threshold can be set higher (e.g., at 80%, such that if more than 80% of the back-of-shelf plane is visible, then no brooms are present in the slot volume). in another example, a bag of chips can occupy a large proportion of its slot volume (e.g., a rectangular bag of chips within a rectangular slot volume). Accordingly, the ratio threshold can be set lower (e.g., at 20%, such that if more than 20% of the back-of-shelf plane is visible, then no bags of chips are present in the slot volume). The computer system can implement the methods and techniques described herein to calculate the ratio of the pixels in the slot volume that are within the threshold distance of the back-of-shelf plane (e.g., a proportion of the back-of-shelf plane that is likely visible); if the ratio exceeds the ratio threshold, the computer system can identify the product type associated with the slot as out-of-stock; and flag the slot for restocking. Alternatively, if the ratio falls below the ratio threshold, the computer system can identify the product type associated with the slot as in-stock. The computer system can then update the realogram or global stock record with the stock condition of the slot. The computer system can then repeat the out-of-stock detection for each slot tag detected in the wall rack area of the inventory structure.

In another implementation, the computer system can implement the methods and techniques described above to confirm a presence of product units in a slot—rather than a visible presence of the back-of-shelf plane of the slot. In particular, the computer system can detect a presence of pixels that are more than a threshold distance from the back-of-shelf plane—indicating that products are present.

11.2 Below Shelf Tag

In another variation, the computer system can detect out-of-stock conditions for product types configured to be stored in slots on a lower shelf in an inventory structure, with a slot tag arranged on a shelf face proximal and above the slot. The below shelf tag slot requires a particular definition of the target region, due to the position of a unit of a product type in the slot relative to the below shelf tag corresponding to the slot. The below shelf tag slot can be defined based on: the first shelf face, which supports the below shelf tag; a lower boundary of the slot, such as a second shelf face; or the floor. The target region is then defined as offset from the lower boundary of this slot by the product dimension, rather than offset from the slot tag.

For example, the computer system can execute a variation of Blocks of the method S100 including: detecting a first shelf face in the first depth image; detecting a second shelf face below the first shelf face in the first depth image; and detecting the first slot tag proximal the first shelf face; defining the region of the first depth image below the first slot tag extending to the second shelf face; and defining the first target region, offset from the second shelf face by the first product dimension in the first depth image.

Therefore the computer system can define a target region for this non-standard slot and accurately define a back-of-shelf plane by implementing the methods and techniques described above and applying a non-standard definition of the target region based on the slot configuration.

11.8 Shelf Pusher

In one variation, the computer system can detect out-of-stock conditions for product types configured to be stored in slots including a shelf pusher. For example, an inventory structure can have a slot including a translatable, spring-loaded pusher configured to push product units stored in the slot towards a front shelf face of the slot —such as is generally found in a deodorant section of a store—and maintain available inventory as front-facing units for customers. In this variation, the computer system can detect the pusher as the back-of-shelf plane for the slot and detect an out-of-stock condition based on a visibility of the pusher.

In one implementation, the computer system can: access a photographic and/or depth image of an inventory structure; detect a shelf on the inventory structure; detect a shelf face (e.g., based on positions of a set of slot tags); detect a slot (e.g., based on a position of a slot tag in the photographic and/or depth image and/or a planogram indicating a location of the slot within the store); define a slot volume representing a volumetric space designated for the slot (e.g., extending laterally across substantially a full width of the slot, vertically between the shelf face and an adjacent shelf face, and rearward from the shelf face); identify the slot as including a pusher (e.g., based on the planogram, the slot tag and/or a product identifier detected on the slot tag, and/or a presence of a plastic rail at the front shelf face to prevent product units from being pushed out of the slot by the pusher); and retrieve a set of template features defining the pusher (e.g., geometry, color). For example, a pusher can have known features (e.g., a vertical rectangle with a 7 cm height and 4 cm width) that differ from features of a product unit occupying the slot with the pusher.

To detect an out-of-stock condition of the slot, the computer system can then detect a visibility of the pusher based on the set of template features defining the pusher. In particular, the computer system can: scan the slot volume for a set of pixels intersecting the slot volume in the depth image of the inventory structure; detect a presence of pixels within a threshold distance of the shelf face of the slot (e.g., within 10 millimeters); align the pixels within the threshold distance to the set of template features defining the pusher; identify a product type associated with the slot as out-of-stock based on a correlation between the pixels and the set of template features falling below an error threshold (e.g., 10%); and flag the slot for restocking with product units of the product type. Alternatively, the computer system can identify the product type associated with the slot as in-stock based on the correlation between the pixels and the set of template features exceeding the error threshold. The computer system can then update the realogram or global stock record with the stock condition of the slot. The computer system can then repeat the out-of-stock detection for each slot detected in the depth and/or photographic image of the inventory structure.

In another variation, the computer system can implement the methods and techniques described above to confirm a presence of product units in a slot—rather than a visible presence of the back-of-shelf plane of the slot. In particular, the computer system can: retrieve a set of template features defining a product unit of the product type associated with the slot (e.g., geometry, color, volumetric definition); scan the slot volume for a set of pixels intersecting the slot volume in the depth image of the inventory structure; detect a presence of pixels within a threshold distance of the shelf face of the slot (e.g., within 10 millimeters); align the pixels within the threshold distance to the set of template features defining the product unit; identify the product type associated with the slot as out-of-stock based on a correlation between the pixels and the set of template features falling below an error threshold (e.g., 10%); and flag the slot for restocking with product units of the product type.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising, at a first time:
  dispatching a mobile robotic system to automatically navigate along an inventory structure and capture a set of depth images depicting the inventory structure;
  accessing a first depth image, in the set of depth images, of the inventory structure, the first depth image captured by the mobile robotic system at a first time;
  detecting a first slot region of the first depth image depicting a first slot;
  identifying a first product type assigned to the first slot;

accessing a first product dimension of the first product type;
detecting a first shelf face in the first depth image;
defining a first target region, offset above the first shelf face by the first product dimension, in the first depth image;
defining a first product region, between the first shelf face and the first target region, in the first depth image;
defining a first back-of-shelf plane intersecting the first target region of the first depth image;
detecting a first depth of a first surface within the first product region; and
in response to the first depth of the first surface intersecting the first back-of-shelf plane:
identifying the first slot as empty; and
generating a prompt to restock the first slot with product units of the first product type.

2. The method of claim 1:
further comprising:
   detecting a second slot region of the first depth image, adjacent the first slot region, representing a second slot;
   identifying a second product type assigned to the second slot;
   accessing a second product dimension of the second product type;
   defining a second target region, offset above the first shelf face by the second product dimension, in the first depth image; and
   defining a second product region, between the first shelf face and the second target region, in the first depth image;
wherein defining the first back-of-shelf plane comprises defining the first back-of-shelf plane intersecting the first target region and the second target region of the first depth image; and
further comprising:
   calculating an offset distance between a second surface within the second product region of the first depth image and the first back-of-shelf plane; and
   in response to the offset distance between the second surface and the first back-of-shelf plane exceeding a threshold difference, identifying the second slot as occupied.

3. The method of claim 1:
wherein detecting the first slot region of the first depth image depicting the first slot comprises detecting the first slot region of the first depth image depicting the first slot in a first inventory section of the inventory structure; and
further comprising
   detecting a second slot region of the first depth image depicting a second slot in a second inventory section of the inventory structure;
   identifying a second product type assigned to the second slot;
   accessing a second product dimension of the second product type;
   detecting a second shelf face in the first depth image;
   defining a second target region, offset above the second shelf face by the second product dimension, in the first depth image;
   defining a second product region, between the second shelf face and the second target region, in the first depth image;
   defining a second back-of-shelf plane intersecting the second target region of the first depth image, separate from the first back-of-shelf plane;
   detecting a second depth of a second surface within the second product region; and
   in response to the second depth of the second surface intersecting the second back-of-shelf plane:
      identifying the second slot as empty; and
      generating a prompt to restock the second slot with product units of the second product type.

4. The method of claim 1, further comprising:
detecting a first top edge of the first shelf face in the first depth image;
defining a first top-of-shelf plane intersecting the first top edge of the first shelf face;
detecting a second slot region of the first depth image, below the first slot region, representing a second slot;
identifying a second product type assigned to the second slot;
accessing a second product dimension of the second product type;
detecting a second shelf face below the first shelf face in the first depth image;
defining a second target region, offset above the second shelf face by the second product dimension, in the first depth image;
defining a second product region, between the second shelf face and the second target region, in the first depth image; and
in response to the first back-of-shelf plane in the second target region obstructed by the first shelf face in the first depth image:
   extending the first back-of-shelf plane from the first slot region to intersect the second slot region;
   detecting a second top edge of the second shelf face in the first depth image;
   defining a second top of shelf plane intersecting the second top edge of the second shelf face;
   detecting a second depth of a second surface, above the second top-of-shelf plane, within the second slot region;
   calculating an offset distance between the second surface within the second slot region and the first back-of-shelf plane; and
   in response to the offset distance between the second surface and the first back-of-shelf plane exceeding a threshold difference, identifying the second slot as occupied.

5. The method of claim 1:
further comprising, detecting a second shelf face above the first shelf face; and
wherein defining the first target region comprises defining the first target region offset above the first shelf face by the first product dimension and extending to the second shelf face, in the first depth image.

6. The method of claim 1:
further comprising:
   accessing a first color image captured concurrently with the first depth image;
   detecting a first slot tag associated with the first slot in the first color image; and
   detecting a first product identifier in the first slot tag in the first color image; and
wherein identifying the first product type assigned to the first slot comprises identifying the first product type of the first slot based on the first product identifier.

7. The method of claim 1:
further comprising:
   detecting a second slot region of the first depth image, below the first slot region, representing a second slot;
   identifying a second product type assigned to the second slot; and
   accessing a second product dimension of the second product type, different from the first product dimension; and
wherein defining the first target region, offset above the first shelf face by the first product dimension, in the first depth image comprises defining the first target region, offset above the first shelf face by the greater of the first product dimension and the second product dimension.

8. The method of claim 1, further comprising:
at the first time, further comprising recording the first back-of-shelf plane in a database; and
at a second time further comprising:
accessing a second depth image of the inventory structure, the second depth image captured by the mobile robotic system at a second time;
detecting a second slot region of the second depth image depicting the first slot;
detecting a second shelf face in the second depth image;
defining a second target region, offset above the second shelf face by the first product dimension, in the second depth image;
defining a second product region, between the second shelf face and the second target region, in the second depth image;
identifying the second target region as obstructed in the second depth image; and
in response to identifying the second target region as obstructed in the second depth image;
accessing the first back-of-shelf plane from the database;
projecting the first back-of-shelf plane to intersect the second slot region depicting the first slot;
detecting a second depth of a second surface within the second product region; and
in response to the second depth of the second surface intersecting the first back-of-shelf plane:
identifying the first slot as empty; and
generating a prompt to restock the first slot with product units of the first product type.

9. The method of claim 1, further comprising:
at a first time further comprising:
recording the first back-of-shelf plane in a database; and
calculating a first shelf depth distance between the first shelf face and the back-of-shelf plane in the first slot region of the first depth image; and
at a second time further comprising:
accessing a second depth image of the inventory structure, the second depth image captured by the mobile robotic system at a second time;
detecting a second slot region of the second depth image depicting the first slot;
detecting a second shelf face in the second depth image;
defining a second target region, offset above the second shelf face by the first product dimension, in the second depth image;
defining a second back-of-shelf plane intersecting the second target region of the second depth image;
calculating a second shelf depth distance between the second shelf face and the second back-of-shelf plane in the second slot region of the second depth image; and
calculating an offset distance between the first shelf depth distance and the second shelf depth distance; and in response to the offset distance less than a threshold distance, increasing a confidence value associated with the first back-of-shelf plane in the database.

10. The method of claim 9:
wherein, at the second time, calculating the offset distance between the first shelf depth distance and the second shelf depth distance comprises calculating the offset distance between the first shelf depth distance and the second shelf depth distance as greater than the threshold distance; and
further comprising, at the second time, in response to calculating the offset distance between the first shelf depth distance and the second shelf depth distance as greater than exceeding the threshold distance:
decreasing the confidence value associated with the first back-of-shelf plane in the database; and
generating a prompt to investigate the second slot.

11. The method of claim 1:
further comprising:
   accessing a first color image of the inventory structure;
   detecting the first slot region in the first color image;
   accessing a first product feature representing the first product type; and
   scanning the first slot region in the first color image for the first product feature;
wherein detecting the first depth of a first surface within the first product region comprises, in response to detecting absence of the first product feature in the first slot region, calculating an offset distance between the first surface within the first product region and the back-of-shelf plane; and
wherein identifying the first slot as empty comprises, in response to the offset distance falling below a threshold distance, identifying the first slot as empty.

12. A method comprising:
dispatching a mobile robotic system to automatically navigate along an inventory structure and capture a set of depth images depicting the inventory structure;
accessing a first color image of the inventory structure;
accessing a first depth image, in the set of depth images, of the inventory structure, the first depth image captured by the mobile robotic system at a first time;
detecting a first slot tag in the first color image;
defining a first slot region in the first color image depicting a first slot in the inventory structure proximal the first slot tag;
defining a second slot region in the first depth image depicting the first slot in the inventory structure proximal the first slot tag;
identifying a first product type assigned to the first slot;
accessing a first product dimension of the first product type;
defining a first target region, offset from the first slot tag by the first product dimension, in the first depth image;
defining a first product region, between the first slot tag and the first target region, in the first depth image;
defining a back-of-shelf plane intersecting the first target region of the first depth image;
detecting a first depth of a first surface within the first product region; and
in response to the first depth of the first surface intersecting the back-of-shelf plane:
identifying the first slot as empty; and
generating a prompt to restock the first slot with product units of the first product type.

13. The method of claim 1:
wherein defining the second slot region in the first depth image depicting the first slot based on the first slot tag comprises defining the second slot region of the first depth image below the first slot tag; and
wherein defining the first target region, offset from the first slot tag by the first product dimension, in the first depth image comprises defining the first target region, offset from the first slot tag by the first product dimension from the first slot tag, in the first depth image.

14. The method of claim 12:
wherein defining the region of the first depth image depicting the first slot based on the first slot tag comprises defining the region of the first depth image above the first slot tag; and
wherein defining the first target region, offset from the first slot tag by the first product dimension, in the first depth image comprises defining the first target region, offset from the first slot tag by the first product dimension, in the first depth image.

15. The method of claim 12:
further comprising:
  detecting a first shelf face in the first depth image; and
  detecting a second shelf face below the first shelf face in the first depth image; and
wherein detecting the first slot tag defining the first slot, in the inventory structure, in the first color image comprises detecting the first slot tag proximal the first shelf face;
wherein defining the second slot region of the first depth image proximal the first slot tag comprises defining the region of the first depth image below the first slot tag extending to the second shelf face; and
wherein defining the first target region comprises defining the first target region, offset from the second shelf face by the first product dimension in the first depth image.

16. A method comprising:
dispatching a mobile robotic system to automatically navigate along an inventory structure and capture a set of depth images depicting the inventory structure;
accessing a first depth image, in the set of depth images, of the inventory structure, the first depth image captured by the mobile robotic system;
detecting a first slot region of the first depth image depicting a first slot;
identifying a first product type assigned to the first slot;
accessing a first product dimension of the first product type;
detecting a first shelf face in the first depth image;
defining a first target region, offset above the first shelf face by the first product dimension, in the first depth image;
defining a first product region, between the first shelf face and the first target region, in the first depth image;
detecting a second slot region of the first depth image, external to the first slot region, depicting a second slot;
detecting a second shelf face in the first depth image;
defining a second target region, offset above the second shelf face by the first product dimension, in the first depth image;
defining a back-of-shelf plane intersecting the second target region of the first depth image;
detecting a second depth of a second surface within the second product region; and
in response to the second depth of the second surface intersecting the back-of-shelf plane:
identifying the second slot as empty; and
generating a prompt to restock the second slot with product units of the second product type.

17. The method of claim 16:
further comprising:
  detecting a third slot region of the first depth image depicting a third slot;
  identifying a third product type assigned to the third slot;
  accessing a third product dimension of the third product type;
  generating a list of product dimensions rank-ordering the first product dimension, the second product dimension, and the third product dimension from greatest to least; and
  accessing a greatest product dimension in the list of product dimensions; and
wherein defining the second target region comprises defining the second target region, offset above the second shelf face by the greatest product dimension, in the first depth image.

18. The method of claim 17:
further comprising:
accessing a color image captured concurrently with the first depth image;
detecting, in the color image:
a first slot tag corresponding to the first slot;
a second slot tag corresponding to the second slot;
a third slot tag corresponding to the third slot;
wherein identifying the first product type assigned to the first slot comprises identifying the first product type based on the first slot tag corresponding to the first slot;
wherein identifying the second product type assigned to the second slot comprises identifying the second product type based on the second slot tag corresponding to the second slot; and
wherein identifying the third product type assigned to the third slot comprises identifying the third product type based on the third slot tag corresponding to the third slot.

* * * * *